(12) United States Patent
Nambara

(10) Patent No.: US 9,753,283 B2
(45) Date of Patent: Sep. 5, 2017

(54) HEAD-UP DISPLAY DEVICE

(71) Applicant: DENSO CORPORATION, Kariya, Aichi-pref. (JP)

(72) Inventor: Takahiro Nambara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/101,745

(22) PCT Filed: Feb. 26, 2015

(86) PCT No.: PCT/JP2015/000990
§ 371 (c)(1),
(2) Date: Jun. 3, 2016

(87) PCT Pub. No.: WO2015/162836
PCT Pub. Date: Oct. 29, 2015

(65) Prior Publication Data
US 2016/0306169 A1 Oct. 20, 2016

(30) Foreign Application Priority Data

Apr. 24, 2014 (JP) ................................ 2014-090442

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 27/01* (2013.01);
(Continued)

(58) Field of Classification Search
CPC .. G02B 27/0101; G02B 7/006; G02B 27/281; H04N 9/3105; H04N 9/3182
See application file for complete search history.

(56) References Cited

U.S. PATENT DOCUMENTS 9,162,622 B2 * 10/2015 Szczerba ............... G01S 13/723
9,551,867 B1 * 1/2017 Grabowski .......... G01C 21/365
(Continued)

FOREIGN PATENT DOCUMENTS

JP S62068821 U 4/1987
JP H07056110 A 3/1995
(Continued)

OTHER PUBLICATIONS

International Search Report and Written Opinion (in Japanese with English Translation) for PCT/JP2015/000990, mailed Apr. 14, 2015; ISA/JP.

*Primary Examiner* — Timothy L Rude
(74) *Attorney, Agent, or Firm* — Harness, Dickey & Pierce, P.L.C.

(57) ABSTRACT

A head-up display device includes a projector, an expansion optical system, an estimating part, a determination part, and a light amount control part. The projector has a light source and a liquid crystal panel. The expansion optical system expands an imagery output from the projector. The estimating part estimates a relative position of the sun with respect to a mobile unit. The determination part determines whether the liquid crystal panel is protected based on a relation between the relative position estimated by the estimating part and a solid angle representing a range in which a light from the sun is incident to the liquid crystal panel through the expansion optical system. The light amount control part decreases an amount of light incident to the liquid crystal panel when the determination part determines that the liquid crystal panel should be protected.

10 Claims, 6 Drawing Sheets

(51) Int. Cl.
*G02B 27/28* (2006.01)
*H04N 9/31* (2006.01)
*G02B 7/00* (2006.01)
*G02B 5/30* (2006.01)

(52) U.S. Cl.
CPC ......... *G02B 27/281* (2013.01); *H04N 9/3105* (2013.01); *H04N 9/3155* (2013.01); *H04N 9/3182* (2013.01); *H04N 9/3194* (2013.01); *B60K 2350/2052* (2013.01); *G02B 5/3058* (2013.01); *G02B 7/006* (2013.01); *G02B 2027/014* (2013.01)

(56) References Cited

U.S. PATENT DOCUMENTS

| | | | |
|---|---|---|---|
| 9,566,946 B2 * | 2/2017 | Loubiere | B60R 99/00 |
| 9,606,357 B2 * | 3/2017 | Hirabayashi | G02B 27/017 |
| 2014/0160100 A1 * | 6/2014 | Edgren | G06T 15/506 |
| | | | 345/207 |
| 2014/0177040 A1 * | 6/2014 | Uehara | G02B 27/0101 |
| | | | 359/352 |
| 2015/0098029 A1 | 4/2015 | Sato et al. | |

FOREIGN PATENT DOCUMENTS

| | | |
|---|---|---|
| JP | 2000131682 A | 5/2000 |
| JP | 2007148092 A | 6/2007 |
| JP | 2013228442 A | 11/2013 |
| WO | WO-2006114950 A1 | 11/2006 |

* cited by examiner

SUN ORBIT

HEAD-UP DISPLAY DEVICE

CROSS REFERENCE TO RELATED APPLICATIONS

This application is a U.S. National Phase Application under 35 U.S.C. 371 of International Application No. PCT/JP2015/000990 filed on Feb. 26, 2015 and published in Japanese as WO 2015/162836 A1 on Oct. 29, 2015. This application is based on and claims the benefit of priority from Japanese Patent Application No. 2014-090442 filed on Apr. 24, 2014. The entire disclosures of all of the above applications are incorporated herein by reference.

TECHNICAL FIELD

The present disclosure relates to a head-up display device (henceforth, HUD device) mounted to a mobile unit, which displays a virtual image of an imagery to be recognized by an occupant by projecting the imagery on a projection component in the mobile unit.

BACKGROUND ART

Conventionally, a HUD device is known, which is mounted in a mobile unit to display a virtual image of an imagery to be recognized by an occupant by projecting the imagery on a projection component in the mobile unit. A HUD device described in Patent Literature 1 includes a projector which projects an imagery, and an expansion lens as an expansion optical system which expands and projects the imagery from the projector to a projection component. In Patent Literature 1, a control part estimates a relative position of the sun relative to a vehicle based on positional information.

In Patent Literature 1, a light reflected on the plane where the sunlight passes the expansion lens is estimated based on the information, and it is determined whether a reflection angle of the reflected light is within a preset angle range. The expansion lens is rotated based on the determination result, such that the expanded image can be recognized with high visibility without noise caused by the reflected light.

PRIOR ART LITERATURES

Patent Literature

Patent Literature 1: JP 2007-148092 A

SUMMARY OF INVENTION

On the other hand, it has been a subject to restrict a rise in temperature of a liquid crystal panel that is affected by heat, in a HUD device equipped with a projector which projects an imagery by making light of a light source to be incident to the liquid crystal panel.

However, in Patent Literature 1 in which the projector has the liquid crystal panel, the sunlight passes through the expansion lens and is incident to the liquid crystal panel, even if the expansion lens is rotated. For this reason, it is difficult to sufficiently control the rise in temperature of the liquid crystal panel.

It is an object of the present disclosure to offer a HUD device in which a rise in temperature of a liquid crystal panel is restricted in a projector.

According to an aspect of the present disclosure, a head-up display device that displays a virtual image of an imagery to be recognized by an occupant by projecting the imagery to a projection component in a mobile unit includes: a projector, an expansion optical system, an estimating part, a determination part, and a light amount control part. The projector has a light source that emits a light and a liquid crystal panel on which the imagery is formed. The projector projects the imagery by making the light emitted from the light source to be incident on the liquid crystal panel. The expansion optical system expands and projects the imagery output from the projector on the projection component. The estimating part estimates a relative position of the sun relative to the mobile unit based on a position of the mobile unit and a position of the sun. The determination part determines whether the liquid crystal panel is to be protected based on a relation between the relative position of the sun estimated by the estimating part and a solid angle which represents a range in which a light of the sun is incident to the liquid crystal panel through the expansion optical system. The light amount control part decreases an amount of light incident to the liquid crystal panel when the determination part determines that the liquid crystal panel is to be protected compared with a case where the determination part determines that the liquid crystal panel is not to be protected.

Accordingly, a rise in temperature of the liquid crystal panel heat caused by the sunlight incident to the liquid crystal panel through the expansion optical system can be detected based on the relation between the relative position of the sun relative to the mobile unit and the solid angle which represents the range in which the light of the sun is incident to the liquid crystal panel through the expansion optical system. That is, since the amount of light incident to the liquid crystal panel is changed by the relation, the rise in temperature of the liquid crystal panel is affected by thermal energy reaching the liquid crystal panel. Therefore, it is determined whether the liquid crystal panel should be protected based on this relation. The amount of light incident to the liquid crystal panel is decreased when it is determined that the liquid crystal panel should be protected than a case where it is determined that the liquid crystal panel is not protected. Thus, the liquid crystal panel can be protected by controlling the rise in temperature of the liquid crystal panel if needed.

DESCRIPTION OF EMBODIMENTS

Figure 1:
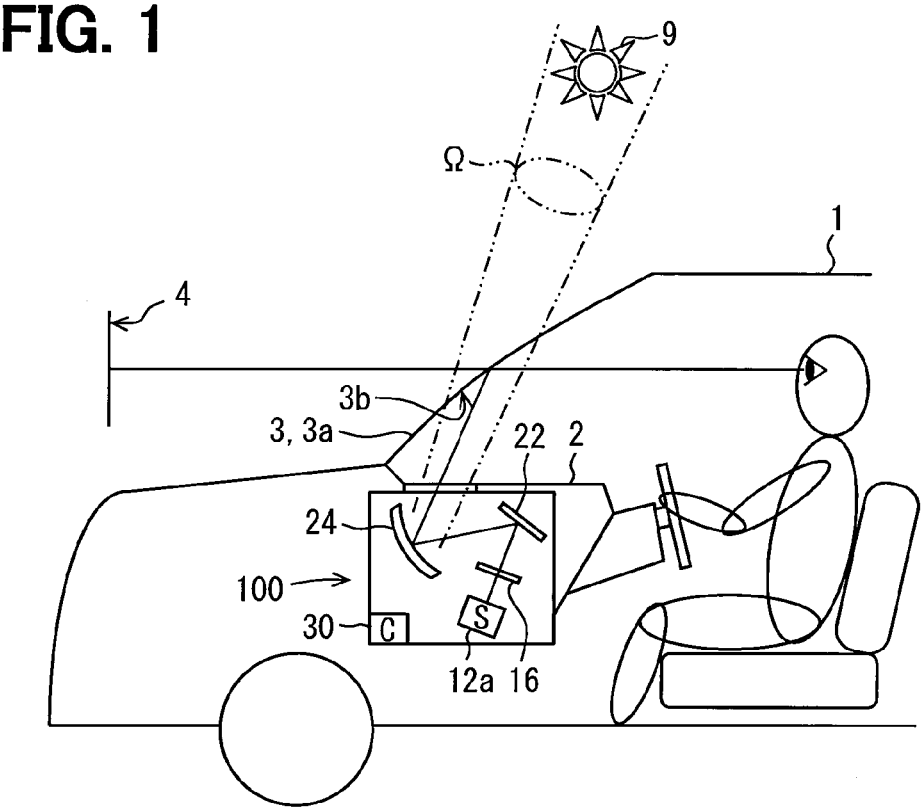
FIG. 1 is a schematic diagram illustrating a HUD device according to a first embodiment mounted to a vehicle.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

As shown in FIG. 1, a head-up display (HUD) device 100 according to a first embodiment is mounted in a vehicle 1 which is a kind of mobile unit, and is disposed inside an instrument panel 2. The HUD device 100 projects an imagery on a projection component 3a integrally formed with a windshield 3 in the vehicle 1. The HUD device 100 displays a virtual image 4 of the imagery to be recognized by an occupant of the vehicle 1. That is, light of the imagery reflected by the projection component 3a reaches the eye of the occupant inside the vehicle 1, and the occupant perceives the light concerned. The occupant can recognize a variety of information that is virtually displayed as imagery, for example, vehicle status value such as vehicle speed and fuel residual quantity, or vehicle information such as road information and field-of-view supplementary information.

The interior surface of the projection component 3a has a projection surface 3b to which an imagery is projected, which is formed in a concave surface shape that is curved or a flat plane. The projection component 3a may have an angle difference between the interior surface and the other surface such that the virtual images 4 formed by reflecting on the surfaces are overlapped with each other. A film such as vapor deposition film may be formed on the projection component 3a in order to control the luminosity of the virtual image 4 due to the reflection on the other surface.

Figure 2:
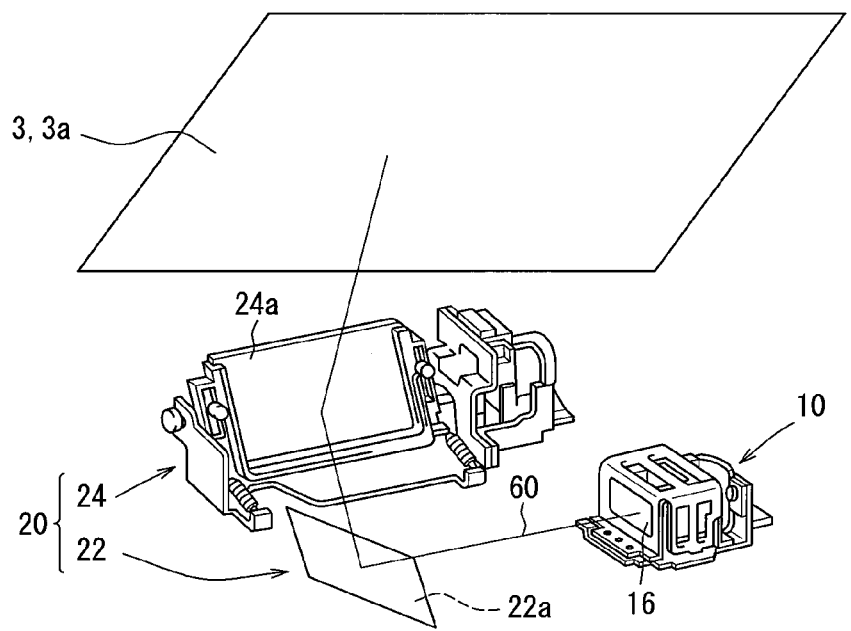
FIG. 2 is a schematic diagram illustrating the HUD device of the first embodiment.

The HUD device 100 includes, as shown in FIG. 2, a projector 10, an expansion optical system 20, and a control circuit 30.

Figure 3:
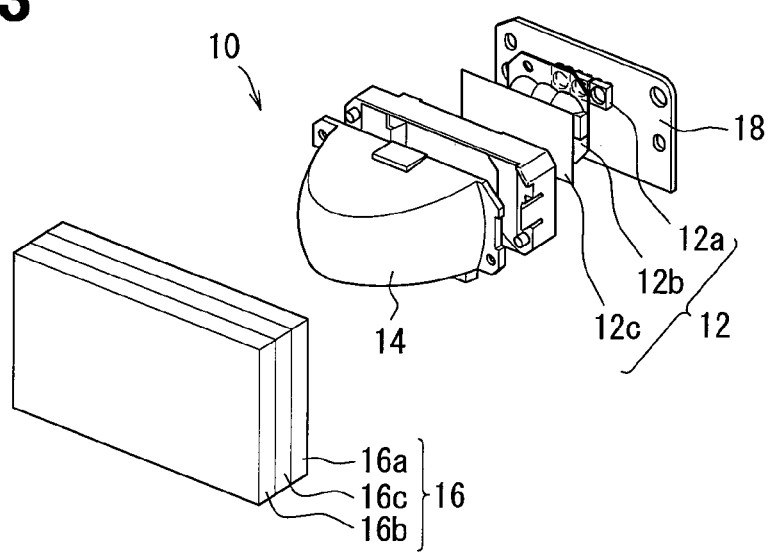
FIG. 3 is a perspective diagram illustrating a projector in the first embodiment.

The projector 10 has, as shown in FIG. 3, a back light 12, a projection lens 14, and a liquid crystal panel 16.

The back light 12 has a light source 12a, a light-gathering lens 12b, and a diffusion board 12c. The light source 12a is a light emitting element such as light emitting diode, and is arranged on a circuit board 18 for the light source. The light source 12a is electrically connected with the control circuit 30 and a power supply (not shown) through a circuit pattern (not shown) on the circuit board 18 for the light source. The light source 12a emits light by being energized, and emits the amount of luminescence according to the amount of current. The light of the light source 12a (henceforth, light source light) is projected to the light-gathering lens. In detail, when the light source is a blue-light emitting diode covered with a phosphor, false-white-light having plural peak wavelengths is emitted.

The light-gathering lens 12b is a translucent convex lens made of synthetic resin or glass, and is arranged between the light source 12a and the diffusion board 12c. The light-gathering lens 12b condenses the light source light from the light source 12a, and ejects the gathered light toward the diffusion board 12c.

The diffusion board 12c is translucent or milk-white-color board made of synthetic resin such as polycarbonate to which optical diffusion material is mixed, and is arranged between the light-gathering lens 12b and the projection lens 14. The light source light adjusted in the luminosity to be uniform by diffusion is ejected toward the projection lens 14 from the diffusion board 12c.

The projection lens 14 is a translucent convex lens made of synthetic resin or glass, and is arranged between the back light 12 and the liquid crystal panel 16. The projection lens 14 gathers the light source light from the back light 12, and projects the gathered light toward the liquid crystal panel 16.

The liquid crystal panel 16 of this embodiment is a transmissive liquid crystal panel, which forms an imagery. A part of light incident into a surface of the liquid crystal panel 16 opposing the light source 12a is made to pass through, and the imagery is displayed by the luminescence from the other surface of the liquid crystal panel 16 opposing the expansion optical system 20. Specifically, the liquid crystal panel 16 is a dot-matrix type TFT (Thin Film Transistor) liquid crystal panel made of plural liquid crystal pixels arranged in two dimensional direction. The liquid crystal panel 16 includes a pair of polarizing plates 16a, 16b and a liquid crystal layer 16c interposed between the polarizing plates 16a, 16b, which are stacked. The polarizing plate 16a, 16b is an absorption type polarization element such as film in which iodine is added to polyvinyl alcohol. The polarizing plates 16a, 16b are arranged such that the orientation directions of molecular iodine are substantially perpendicular to each other. The liquid crystal layer 16c is a layer filled with a solution containing liquid crystal molecules as a main component, for example, Nematic liquid crystal. Among the liquid crystal pixels, the incident light from the light source is absorbed by the polarizing plates 16a, 16b in the pixel in the OFF state, and hardly passes through the liquid crystal panel 16. In contrast, in the pixel in the ON state, among the liquid crystal pixels, a part of the incident light is absorbed by the polarizing plates 16a, 16b, and the other light is converted into a linear polarization light having a predetermined polarization direction and passes through the liquid crystal panel 16. In this embodiment, the polarization direction represents an oscillating direction of the linear polarization light in an electric field. The liquid crystal panel of FIG. 3 typically shows only the stacking state of the polarizing plates 16a, 16b and the liquid crystal layer 16c, and has more complicated structure in practice.

Thus, the light source light is made incident into the liquid crystal panel 16, in the projector 10 which projects an imagery toward the expansion optical system 20 as a light (henceforth, imagery light).

As shown in FIG. 2, the expansion optical system 20 has a plane mirror 22 and a concave mirror 24. The plane mirror 22 has a reflective surface 22a formed by, for example, vapor-depositing aluminum on the surface of the base material made of synthetic resin or glass. The reflective surface 22a is formed in smooth plane shape. The plane mirror 22 reflects the imagery light output from the projector 10 toward the concave mirror 24.

The concave mirror 24 has a reflective surface 24a formed by, for example, vapor-depositing aluminum on the surface of the base material made of synthetic resin or glass. The reflective surface 24a is formed in smooth curved surface shape as a concave surface where the center of the concave mirror 24 is recessed. The concave mirror 24 reflects the imagery light output from the plane mirror 22 toward the projection component 3a.

An optical path 60 passing through the plane mirror 22 and the concave mirror 24 is formed by the expansion optical system 20 which has positive power as a whole. The expansion optical system 20 expands and projects the imagery output from the projector 10 to the projection component 3a. That is, an occupant will sight the virtual image 4 of the imagery expanded by the expansion optical system 20.

As shown in FIG. 2, the light of the sun 9 may enter the optical path of the HUD device as a disturbance light. A part of the light of the sun 9 may pass through the windshield 3, and may be incident into the liquid crystal panel 16 through the expansion optical system 20. The light of the sun 9 incident into the liquid crystal panel 16 through the expansion optical system 20 is gathered by the expansion optical system 20 (especially the concave mirror 24), and reaches the liquid crystal panel 16 with high energy density. Such light of the sun 9 is absorbed by the polarizing plate 16a, 16b of the liquid crystal panel 16 to be converted to heat which brings a rise in the temperature of the liquid crystal panel 16. As a result, the polarizing plate 16a, 16b may melt. In this case, the function of the liquid crystal panel 16 may be lost. According to this embodiment, it is possible to protect the liquid crystal panel 16 by decreasing the amount of light incident to the liquid crystal panel 16.

Figure 4:
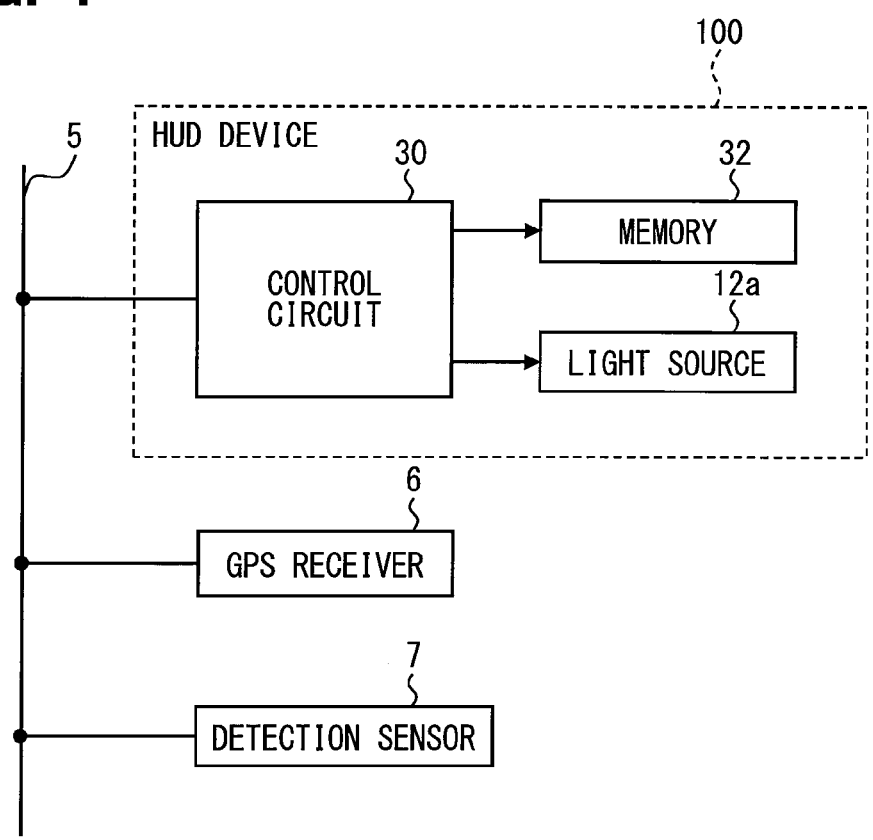
FIG. 4 is a block diagram explaining a control circuit in the first embodiment.

The control circuit 30 is an electronic circuit formed of, for example, a microcomputer (not shown). As shown in FIG. 4, the control circuit 30 is electrically connected with a memory 32 and the light source 12a. The control circuit 30 can communicate with a GPS (Global Positioning System) receiver 6 and a vehicle orientation detection sensor 7 using an in-vehicle LAN 5. The control circuit 30 can output a signal to the light source 12a based on signals inputted from the GPS receiver 6 and the vehicle orientation detection sensor 7.

The memory 32 is a storage medium, and memorizes data of solid angle Ω that represents a range in which the light of the sun 9 is incident to the liquid crystal panel 16 through the expansion optical system 20. The solid angle Ω is beforehand set up based on results computed in consideration of the optical path 60 and the mounting state of the HUD device 100 to the vehicle 1. For example, under a condition where the light of the sun 9 which may be incident into the liquid crystal panel 16 through the expansion optical system 20 passes through the windshield 3, the range where the sun 9 may be located as a light source relative to the HUD device 100 or the vehicle 1 can be computed as the solid angle Ω by pursuing the light from the liquid crystal panel 16 in the backward direction.

The GPS receiver 6 mounted in the vehicle 1 receives electric wave from a satellite, and can detect the current position of the vehicle 1 and the present time. Specifically, the GPS receiver 6 computes the latitude and the longitude corresponding to the present time based on the received electric wave.

The vehicle orientation detection sensor 7 is a detection module mounted to the vehicle 1 and mainly includes a gyroscope sensor to detect the orientation of the vehicle 1. Specifically, three angles, i.e., a pitch angle, a roll angle, and a yaw angle, are computed as the orientation of the vehicle 1, for example, based on the angular velocity detected by the gyroscope sensor. The vehicle orientation detection sensor 7 may be combined with an accelerometer which detects the acceleration of the vehicle 1 or a geomagnetism sensor which detects a magnetic field such as geomagnetism generated in the earth, such that the calculation accuracy of the orientation of the vehicle 1 can be raised.

Figure 5:
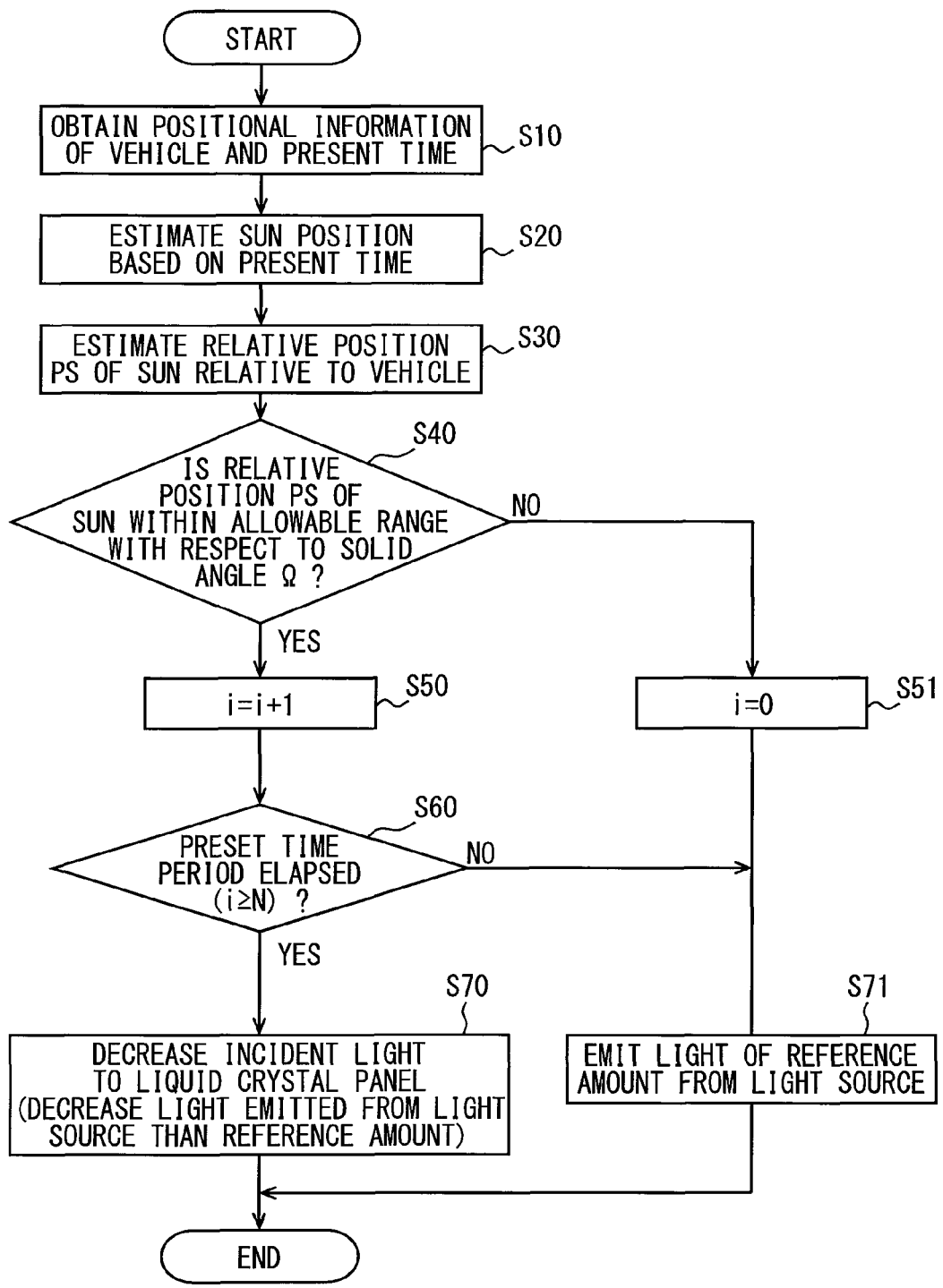
FIG. 5 is a flow chart executed by the control circuit in the first embodiment.

A flow chart carried out by the control circuit 30 is explained in detail with reference to FIG. 5, in which a computer program is executed and repeated with a repetition cycle shorter than a preset time period TS.

First, at Step S10, the positional information of the vehicle 1 and the present time are obtained. Specifically, the present time and the latitude and longitude corresponding to the present time are acquired from the GPS receiver 6 as position information of the vehicle 1. Moreover, the orientation of the vehicle 1 is acquired from the vehicle orientation detection sensor 7 as position information of the vehicle 1. The control circuit moves to Step S20 after processing of Step S10.

At Step S20, the position of the sun 9 is estimated from the present time. Specifically, the position of the sun 9 corresponding to the present time acquired at Step S10 is presumed at a reference position (for example, Akashi corresponding to Japan Standard Time). The position of the sun 9 can be estimated by calculation using a known formula. The control circuit moves to Step S30 after processing of Step S20.

Figure 6:
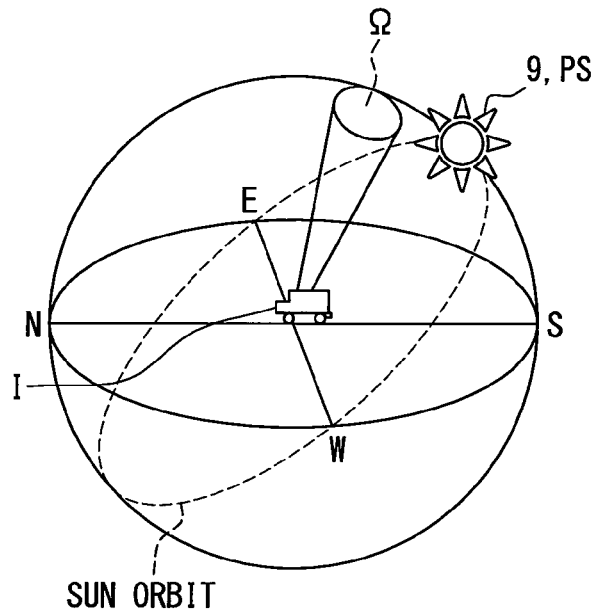
FIG. 6 is a schematic diagram illustrating a relation of a solid angle and a relative position of the sun in the first embodiment.

At Step S30, the relative position PS of the sun 9 to the vehicle 1 is presumed. Specifically, the relative position PS of the sun 9 relative to the vehicle 1 is presumed based on the position information of the vehicle 1 acquired in Step S10 and the position of the sun 9 presumed in Step S20. In detail, as shown in FIG. 6, the position of the sun 9 specified in a coordinate system based on the reference position in Step S20 is converted into a coordinate system based on the position of the vehicle 1, such that the relative position PS of the sun 9 with respect to the vehicle 1 is presumed. Here, the coordinate system based on the position of the vehicle 1 is the same as a coordinate system which represents the solid angle Ω, in which the current position of the vehicle 1 acquired in Step S10 is defined as an origin point, and is determined by a coordinate axis that is set based on the orientation of the vehicle 1. The control circuit moves to Step S40 after processing of Step S30. Step S30 is equivalent to an estimating part.

At the following Steps S40 and S60, it is determined whether the liquid crystal panel 16 should be protected based on the relation between the solid angle Ω and the relative position PS of the sun 9 presumed in Step S30. Steps S40 and S60 are equivalent to a determination part.

First, at Step S40, it is determined whether the relative position PS of the sun 9 is within an allowable range with respect to the solid angle Ω. In this embodiment, it is determined whether the relative position PS of the sun 9 is within the solid angle Ω without limiting the allowable range. The solid angle Ω is obtained by referring to the memory 32. When an affirmation determination is made in Step S40, the control circuit will move to Step S50. When a negative determination is made in Step S40, it is determined that the liquid crystal panel 16 is not protected, and the control circuit will move to Step S51.

At Step S50, a value i of the counter for counting the preset time period TS is incremented (for example, i=i+1). The control circuit moves to Step S60 after processing of Step S50.

At Step S60, it is determined whether the relative position PS of the sun 9 continues to be within the allowable range with respect to the solid angle Ω during the preset time period TS. Specifically, it is determined whether the value i of the counter is higher than or equal to a predetermined value N (namely, i≥1). The predetermined value N is set as a minimum value of integers, in which a product with the repetition cycle exceeds the preset time period TS. The preset time period TS is desirably set shorter than or equal to 10 minutes, and is set as 5 minutes in this embodiment. When an affirmation determination is made in Step S60, the control circuit will move to Step S70 where the liquid crystal panel 16 is protected. When a negative determination is made in Step S60, since the relative position PS of the sun 9 is not continuously within the allowable range with respect to the solid angle Ω during the preset time period TS, the control circuit moves to Step S71 where the liquid crystal panel 16 is not protected.

At Step S70 after an affirmation determination is made at Step S60, the amount of light incident to the liquid crystal panel 16 is decreased compared with a case where a negative determination is made in Step S40 or S60. Specifically, the amount of light emitted from the light source 12a is decreased to be lower than a reference amount in the case where a negative determination is made in Step S40 or S60. In detail, the amount of current supplied to the light source 12a is controlled so that the amount of light emitted from the light source 12a gradually decreases. As the amount of light emitted from the light source 12a decreases, the amount of light incident into the liquid crystal panel 16 through the projection lens 14 from the light source 12a decreases. A series of processings executed by the control circuit 30 are ended after Step S70. Step S70 is equivalent to a light amount control part.

On the other hand, the value i of the counter is reset (for example, i=0) at Step S51 after a negative determination is made in Step S40. That is, since the relative position PS of the sun 9 is not within the allowable range with respect to the solid angle Ω, the count of the preset time period TS will be restarted from zero. The control circuit moves to Step S71 after processing of Step S51.

At Step S71, the amount of light emitted from the light source 12a is set to be the reference amount. The reference amount may be defined in advance as a specification of the HUD device 100, or may be set up by an occupant. A series of processings executed by the control circuit 30 are ended after Step S71.

In addition, the value i of the counter is held by the memory 32, and may be used in a flow chart that includes a determination again executed by the control circuit 30 after the repetition cycle.

(Action and Effect)

The action and effect of the first embodiment is explained below.

According to the first embodiment, a rise in temperature of the liquid crystal panel 16 caused by the light of the sun 9 incident through the expansion optical system 20 can be detected based on the relation between the solid angle Ω representing the range where the light of the sun 9 is incident to the liquid crystal panel 16 through the expansion optical system 20 and the relative position PS of the sun 9 to the vehicle 1. That is, the thermal energy which reaches the liquid crystal panel 16 influences the rise in temperature, since the amount of light incident to the liquid crystal panel 16 is changed by the relation. Therefore, it is determined whether the liquid crystal panel 16 is to be protected based on this relation. When an affirmation determination is made, the amount of light incident to the liquid crystal panel 16 is decreased than a case where a negative determination is made. Accordingly, the liquid crystal panel 16 can be protected by controlling the rise in temperature of the liquid crystal panel 16 if needed.

According to the first embodiment, an affirmation determination is made when the relative position PS of the sun 9 is in the allowable range with respect to the solid angle Ω. Accordingly, when the relative position PS of the sun 9 is in the allowable range, i.e., when it is predicted that a possibility that the light of the sun 9 will enter the liquid crystal panel 16 through the expansion optical system 20 is high, the rise in temperature of the liquid crystal panel 16 can be controlled.

According to the first embodiment, when the relative position PS of the sun 9 continues to be in the allowable range with respect to the solid angle Ω during the preset time period TS, an affirmation determination is made. Accordingly, for example when the travelling direction of the vehicle 1 changes, while the relative position PS of the sun 9 temporarily enters the allowable range, the function to decrease the amount of light incident to the liquid crystal panel 16 can be prevented from erroneously operating.

According to the first embodiment, the amount of light incident to the liquid crystal panel 16 is decreased by decreasing the amount of light emitted from the light source 12a. Accordingly, the rise in temperature of the liquid crystal panel 16 can be controlled.

According to the first embodiment, the amount of light emitted from the light source 12a is decreased gradually. Accordingly, when the amount of light emitted from the light source 12a decreases, an occupant can be restricted from feeling sense of incongruity.

Second Embodiment

Figure 7:
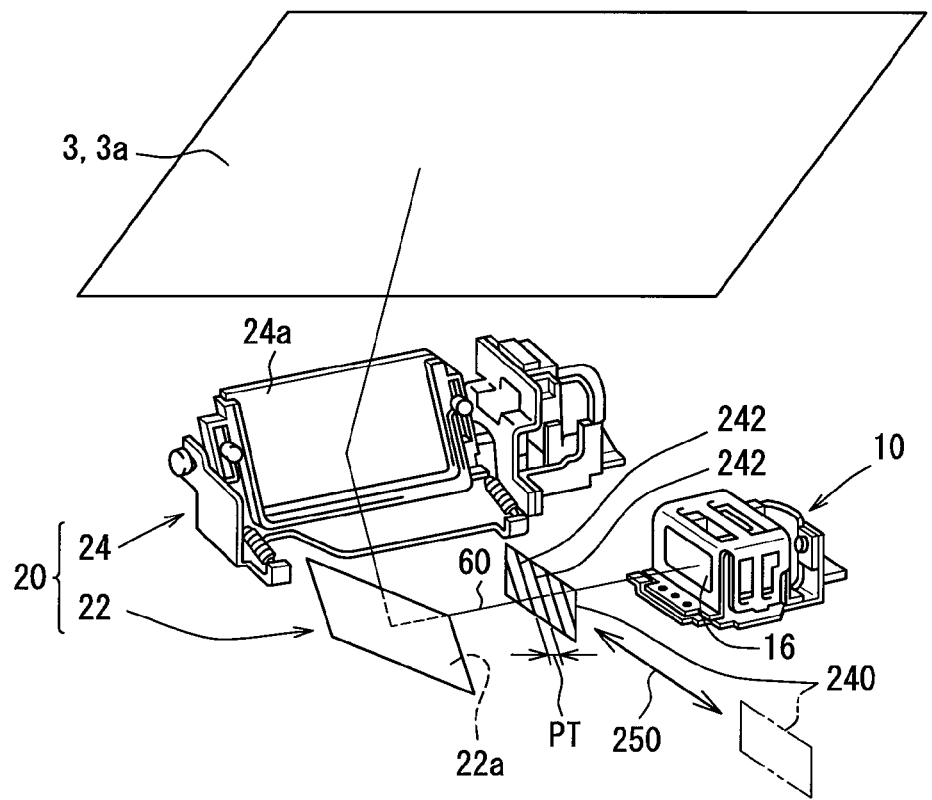
FIG. 7 is a schematic diagram illustrating a HUD device according to a second embodiment.
Figure 8:
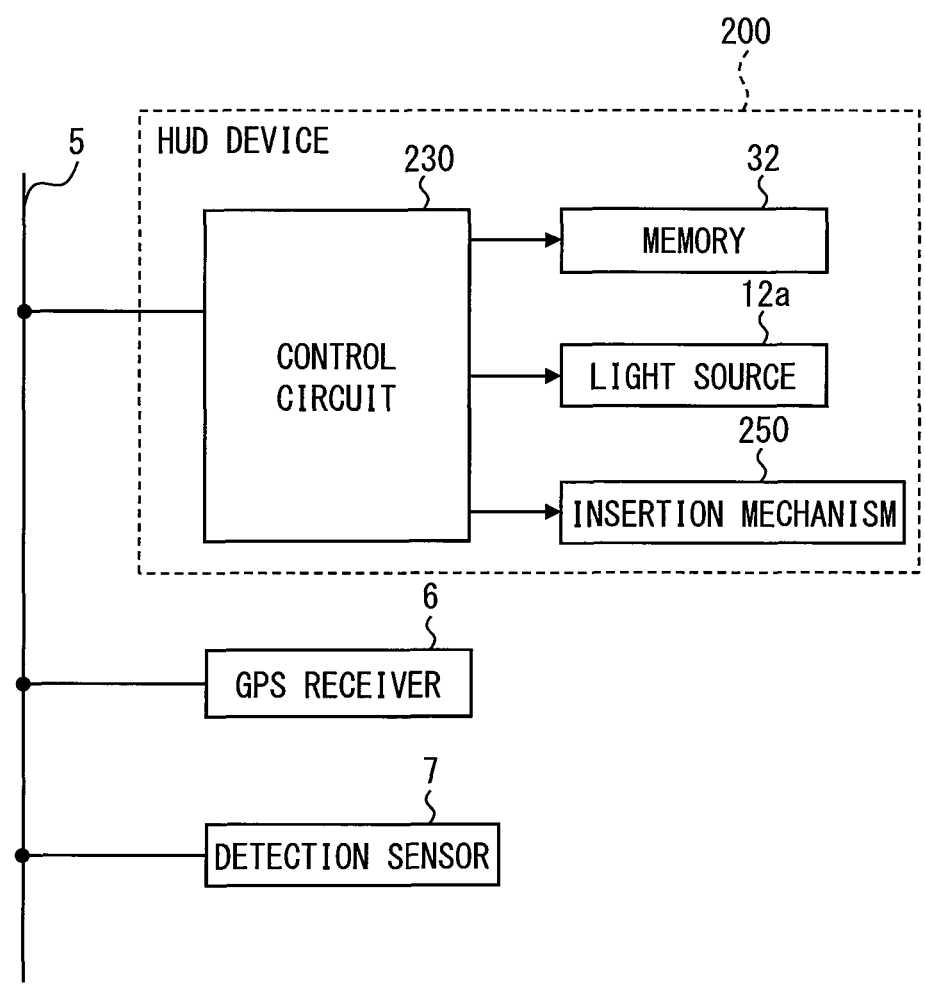
FIG. 8 is a block diagram explaining a control circuit in the second embodiment.
Figure 9:
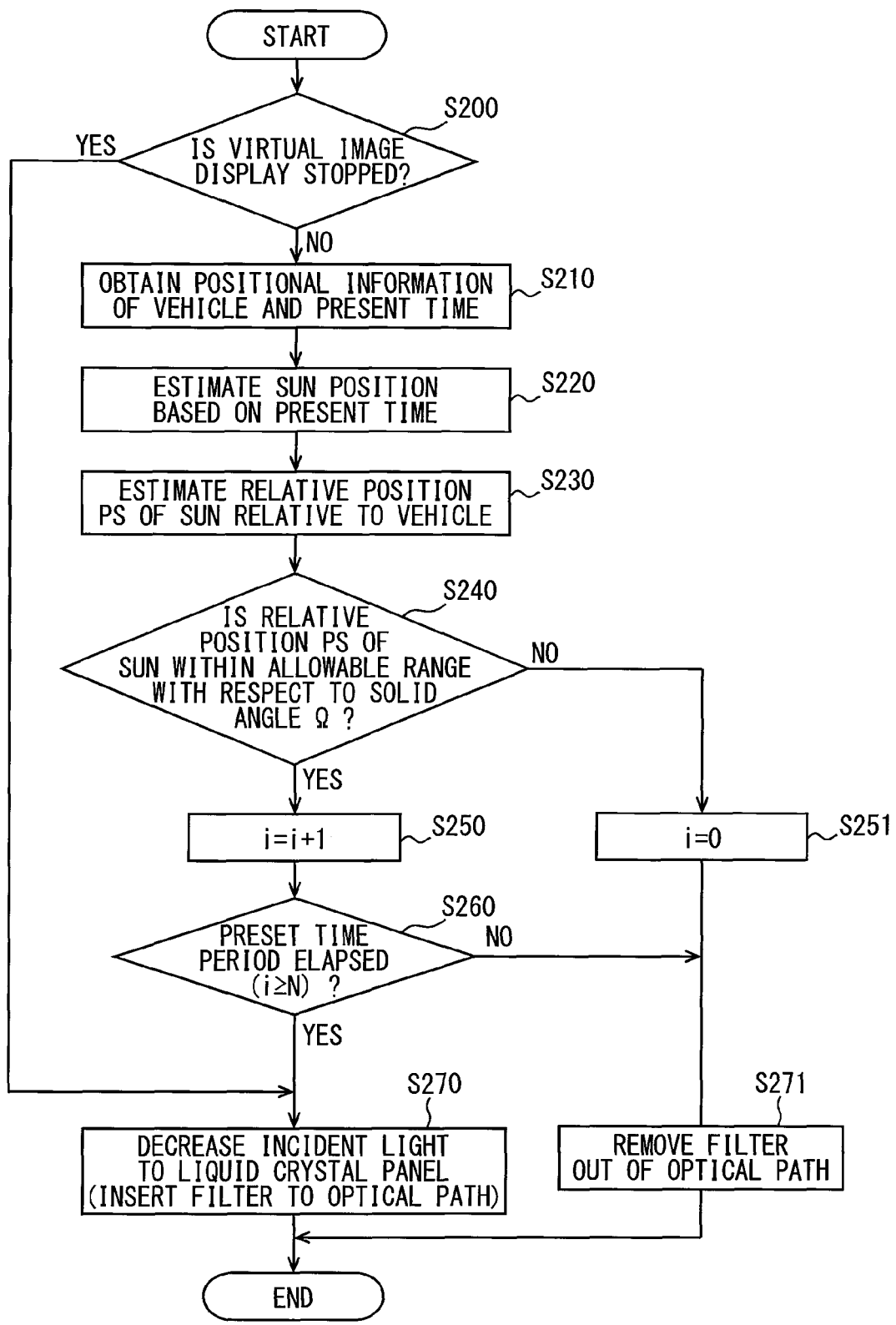
FIG. 9 is a flow chart executed by a control circuit in the second embodiment.

As shown in FIGS. 7-9, a second embodiment is a modification of the first embodiment.

The HUD device 200 in the second embodiment further includes a filter 240 and an insertion mechanism 250, as shown in FIG. 7.

The filter 240 in the second embodiment is a polarizing plate having a tabular shape. The filter 240 which is a polarizing plate is formed by putting plural metal wires 242 between a pair of translucent substrates made of synthetic resin or glass. The metal wires 242 are made of, for example, aluminum, and are arranged approximately parallel mutually with a predetermined pitch PT in a direction along the surface of the filter 240. The predetermined pitch PT is set in consideration of the wavelength and the spectrum of light of the sun 9 incident into the filter 240, for example, as about 200-400 micrometers. In FIG. 7, the metal wires 242 are schematically illustrated, and the reference numeral of the metal wire 242 is shown only in some of them for easy reference.

The characteristics of the filter 240 are explained briefly. When a light having a polarization direction corresponding to the extending direction of the metal wire 242 is incident to the filter 240, many of the incident lights are reflected without passing through the filter. In this embodiment, the extending direction of the metal wire 242 is called as a reflective axis as an axis where the reflection rate becomes the maximum. On the other hand, when a light having a polarization direction corresponding to a direction corresponding to the pitch PT of the metal wires 242 is incident to the filter, many of the incident lights pass through the filter. In this embodiment, the direction corresponding to the pitch PT of the metal wires 242 is called as a transmission axis as an axis where the transmittance rate becomes the maximum.

When the light of the sun 9 which is natural light enters into the filter 240 having such characteristics, a part (for example, 50%) of the light passes through the filter 240, and the other light is reflected by the filter 240.

Moreover, the size of the filter 240 is set to enable all the flux of light of the sun 9 incident into the liquid crystal panel 16 through the expansion optical system 20 to be incident in the filter 240. Specifically, the size of the filter 240 is set to cover the range of the pursued light when the light is pursued in the calculation of the solid angle $\Omega$.

The insertion mechanism 250 is a mechanism which inserts the filter 240 into the optical path 60 between the projection component 3a and the liquid crystal panel 16. In this embodiment, the filter 240 is inserted into the optical path 60 between the expansion optical system 20 and the liquid crystal panel 16. The insertion mechanism 250 moves the filter 240 in parallel along the surface of the filter 240 in the state where the filter 240 is held, such that it is possible to move the filter back and force between inside of the optical path 60 and outside of the optical path 60. The insertion mechanism 250 inserts the filter 240 into the optical path 60 in a manner that the transmission axis of the filter 240 as a polarizing plate is mated with the polarization direction of the imagery light from the liquid crystal panel 16. Moreover, the insertion mechanism 250 inserts the filter 240 such that the surface of the filter 240 becomes substantially perpendicular to the optical axis.

The control circuit 230 in the second embodiment is an electronic circuit mainly including, for example, a microcomputer (not shown). As shown in FIG. 8, the control circuit 230 is electrically connected with the insertion mechanism 250 in addition to the memory 32 and the light source 12a. Similarly to the first embodiment, the control circuit 230 can communicate with the GPS (Global Positioning System) receiver 6 and the vehicle orientation detection sensor 7 using the in-vehicle LAN 5. The control circuit 230 can output a signal to the insertion mechanism 250 based on signals inputted from the GPS receiver 6 and the vehicle orientation detection sensor 7.

Below, a flow chart repeatedly carried out by the control circuit 230 by executing a computer program with a repetition cycle is explained in detail based on FIG. 9.

First, at Step S200, it is determined whether a display of the virtual image of the imagery is stopped. When a signal which reports that an engine switch (not shown) is turned OFF is inputted, as an example, an affirmation determination is made that a display of the virtual image of the imagery is stopped. When an affirmation determination is made in Step S200, the control circuit will move to Step S270. When a negative determination is made in Step S200, the control circuit will move to Step S210.

Since Step S210-S260 are the same processings as Step S10-S60 of the first embodiment, the explanation is omitted here.

At Step S270 after an affirmation determination is made in Step S200 or S260, the amount of light incident to the liquid crystal panel 16 is decreased than a case where a negative determination is made in Step S240 or S260. Specifically, the control circuit 230 outputs a signal to the insertion mechanism 250, thereby the filter 240 is inserted into the optical path 60 by the insertion mechanism 250. As a result, the light of the sun 9 heading to the liquid crystal panel 16 through the expansion optical system 20 enters into the filter 240. Due to the above-mentioned characteristics, a part of light of the sun 9 entering the filter 240 is reflected toward the expansion optical system 20. That is, the light of the sun 9 travelling toward the liquid crystal panel 16 through the expansion optical system 20 is regulated by the filter 240. Thus, the amount of light incident into the liquid crystal panel 16 through the expansion optical system 20 from the sun 9 decreases. A series of processings by the control circuit 230 are ended after Step S270. Step S270 is equivalent to a light amount control part.

At Step S271 after a negative determination is made in Step S240 or S260, the filter 240 is moved out of the optical path 60 by the insertion mechanism 250. A series of processings by the control circuit 230 are ended after Step S271.

In the second embodiment described above, the control circuit 230 determines whether to protect the liquid crystal panel 16 based on the relation between the solid angle $\Omega$ and the relative position PS of the sun 9. When an affirmation determination is made, the amount of light incident to the liquid crystal panel 16 is decreased than a case where a negative determination is made. Therefore, it becomes possible to obtain the action and effect according to the first embodiment.

According to the second embodiment, the HUD device 200 includes the filter 240 which regulates the light of the sun 9 incident into the liquid crystal panel 16 through the expansion optical system 20, and the insertion mechanism 250 which inserts the filter 240 into the optical path 60 between the projection component 3a and the liquid crystal panel 16. When an affirmation determination is made in case where it is determined whether the liquid crystal panel 16 is to be protected, the filter 240 is inserted into the optical path 60. Accordingly, a rise in temperature of the liquid crystal panel 16 can be easily controlled by regulating the light of the sun 9 incident into the liquid crystal panel 16 through the expansion optical system 20.

The light of the sun 9 located in the solid angle $\Omega$ is condensed by the expansion optical system 20 and travels to the liquid crystal panel 16. According to the second embodiment, the filter 240 is inserted into the optical path 60 between the expansion optical system 20 and the liquid crystal panel 16. Accordingly, since the light of the sun 9 is regulated by the filter 240 in the condensed state, the size of the filter can be made smaller.

According to the second embodiment, the filter 240 is a polarizing plate and is inserted such that the transmission axis of the filter 240 is mated with the polarization direction of the light of the imagery. Accordingly, the filter 240 regulates the light of the sun 9 while the light of the imagery is made to pass through in accordance with the transmission axis. Therefore, a rise in temperature of the liquid crystal panel 16 can be restricted while a fall in luminosity of the virtual image 4 of the imagery is restricted.

According to the second embodiment, the filter 240 reflects at least a part of the light of the sun 9 via the expansion optical system 20 toward the expansion optical system 20. Since the thermal energy which reaches the liquid crystal panel 16 is controlled, the rise in temperature of the liquid crystal panel 16 can be controlled.

According to the second embodiment, the filter 240 is inserted into the optical path 60, when the display of virtual image of the imagery is suspended. Accordingly, when the HUD device 200 is not being used, the rise in temperature of the liquid crystal panel 16 can be controlled.

Other Embodiment

While the embodiments of the present disclosure are described, the present disclosure is not restricted to the embodiments, and can be implemented with various modification in the range not deviating from the scope of the present disclosure.

As a first modification of the first to second embodiments, the solid angle $\Omega$ may be set by simulations other than the pursuit of light in the reverse direction. Moreover, the solid angle $\Omega$ may be set based on experimental results.

As a second modification of the first to second embodiments, the allowable range may be set larger with respect to the solid angle $\Omega$ in the determination of Step S40 or S240.

As a third modification of the first to second embodiments, the determination of Step S60 or S260 may be omitted such that the control circuit moves from Step S40 or S240 directly to Step S70, S270, or S71, S271. That is, it may be determined whether a liquid crystal panel is to be protected by a single determination.

As a fourth modification of the first embodiment, the amount of light emitted from the light source 12a may be decreased stepwise in Step S70.

As a fifth modification of the second embodiment, the filter 240 may be inserted by the insertion mechanism 250 into the optical path 60 between the projection component 3a and the expansion optical system 20 in Step S270.

As a sixth modification of the second embodiment, the filter 240 may be a light-reducing filter in which a metal thin film is formed on a translucent substrate made of synthetic resin or glass.

As a seventh modification of the second embodiment, the filter 240 may be replaced with a filter which absorbs at least a part of the light of the sun 9 incident through the expansion optical system 20. In this case, the filter may be a polarizing plate having the same configuration as the polarizing plate 16a, 16b of the liquid crystal panel 16. Moreover, the filter may be a light-reducing filter in which a light absorption substance is mixed in a translucent substrate made of synthetic resin or glass.

As an eighth modification of the second embodiment, the filter 240 may be located out of the optical path 60 when the display of the virtual image of the imagery is stopped.

As a ninth modification of the first and second embodiments, the amount of light incident to the liquid crystal panel 16 may be decreased both by decreasing the amount of light emitted from the light source 12a and by inserting the filter 240 into the optical path 60.

As a tenth modification of the first to second embodiments, the HUD device 100 of the present disclosure may be applied to various mobile units (transport machine) such as vessel or airplane other than vehicle 1.

What is claimed is:

1. A head-up display device that displays a virtual image of an imagery to be recognized by an occupant by projecting the imagery to a projection component in a mobile unit, the head-up display device comprising:
    a projector having a light source that emits a light and a liquid crystal panel on which the imagery is formed, the projector projecting the imagery by making the light emitted from the light source to be incident on the liquid crystal panel;
    an expansion optical system that expands and projects the imagery output from the projector on the projection component;
    an estimating part that estimates a relative position of the sun relative to the mobile unit based on a position of the mobile unit and a position of the sun;
    a determination part that determines whether the liquid crystal panel is to be protected based on a relation between the relative position of the sun estimated by the estimating part and a solid angle which represents a range in which a light of the sun is incident to the liquid crystal panel through the expansion optical system; and
    a light amount control part that decreases an amount of light incident to the liquid crystal panel when the determination part determines that the liquid crystal panel is to be protected compared with a case where the determination part determines that the liquid crystal panel is not to be protected.

2. The head-up display device according to claim 1, wherein
    the determination part determines that the liquid crystal panel is to be protected when the relative position of the sun is within an allowable range with respect to the solid angle.

3. The head-up display device according to claim 2, wherein
    the determination part determines that the liquid crystal panel is to be protected when the relative position of the sun continues to be within the allowable range with respect to the solid angle during a preset time period.

4. The head-up display device according to claim 1, wherein
    the light amount control part decreases the amount of light incident to the liquid crystal panel by decreasing an amount of light emitted from the light source.

5. The head-up display device according to claim 4, wherein
    the light amount control part gradually decreases the amount of light emitted from the light source.

6. The head-up display device according to claim 1, further comprising:
    a filter that regulates the light of the sun incident to the liquid crystal panel through the expansion optical system; and
    an insertion mechanism that inserts the filter into an optical path between the projection component and the liquid crystal panel, wherein
    the light amount control part decreases the amount of light incident to the liquid crystal panel by inserting the filter into the optical path by the insertion mechanism.

7. The head-up display device according to claim 6, wherein
    the light amount control part controls the insertion mechanism to insert the filter into the optical path between the expansion optical system and the liquid crystal panel.

8. The head-up display device according to claim 6, wherein
    the filter is a polarizing plate, and
    the light amount control part controls the insertion mechanism to insert the filter by mating a transmission axis of the filter with a polarization direction of light of the imagery.

9. The head-up display device according to claim 6, wherein
    the light amount control part reflects at least a part of the light of the sun incident to the filter through the expansion optical system toward the expansion optical system.

10. The head-up display device according to claim 6, wherein
    the light amount control part controls the insertion mechanism to insert the filter into the optical path when a display of the virtual image of the imagery is stopped.

* * * * *